United States Patent
Mori (10) Patent No.: US 9,539,967 B2
(45) Date of Patent: Jan. 10, 2017

(54) VEHICLE BODY IMPACT ABSORPTION STRUCTURE

(71) Applicant: TOYOTA JIDOSHA KABUSHIKI KAISHA, Toyota-shi, Aichi-ken (JP)

(72) Inventor: Takeo Mori, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/568,688

(22) Filed: Dec. 12, 2014

(65) Prior Publication Data

US 2015/0175109 A1 Jun. 25, 2015

(30) Foreign Application Priority Data

Dec. 24, 2013 (JP) ................. 2013-265220

(51) Int. Cl.
*B60R 19/34* (2006.01)
*B60R 19/12* (2006.01)
*B62D 21/15* (2006.01)

(52) U.S. Cl.
CPC .............. *B60R 19/34* (2013.01); *B60R 19/12* (2013.01); *B62D 21/152* (2013.01)

(58) Field of Classification Search
CPC .......... B60R 19/12; B60R 19/24; B60R 19/26; B60R 19/34; B62D 21/152; F16F 7/003; F16F 7/122
USPC ................ 293/132, 133; 296/187.09, 193.09
See application file for complete search history.

(56) References Cited

U.S. PATENT DOCUMENTS

| 8,562,042 B2 * | 10/2013 | Gonin | ..................... B60R 19/12 293/132 |
| 9,004,576 B2 * | 4/2015 | Sakakibara | .......... B62D 25/085 293/133 |
| 2007/0040398 A1 | 2/2007 | Lutke-Bexten et al. | |
| 2009/0058134 A1 | 3/2009 | Hiraishi et al. | |
| 2011/0316295 A1 | 12/2011 | Yamada et al. | |
| 2012/0049571 A1 | 3/2012 | Katou et al. | |

(Continued)

FOREIGN PATENT DOCUMENTS

DE 10154113 A1 * 5/2003 ............. B60R 19/12
EP 1256510 A1 11/2002

(Continued)

*Primary Examiner* — Jason S Daniels
(74) *Attorney, Agent, or Firm* — Andrews Kurth Kenyon LLP (57) ABSTRACT

A vehicle body impact absorption structure includes a bumper reinforcement, an upper vehicle body frame member, a lower vehicle body frame member, and an impact absorption box. The impact absorption box includes a rear portion, which is connected to the upper and lower vehicle body frame members, and a front portion, which is connected to the bumper reinforcement. The impact absorption box includes an upper impact absorption portion, which has a closed cross-section, a lower impact absorption portion, which has a closed cross-section, a front connection portion, which has a closed section, and a communication portion. The front connection portion connects the upper and lower impact absorption portions. The communication portion is located at the rear side of the front connection portion. The communication portion includes an opening extending through the impact absorption box in the lateral direction of the vehicle body.

5 Claims, 8 Drawing Sheets

(56) References Cited

U.S. PATENT DOCUMENTS

2014/0008936 A1\* 1/2014 Kim .................. B60R 19/34
296/187.09

FOREIGN PATENT DOCUMENTS

| EP | 2295296 A2 | 3/2011 | | |
|---|---|---|---|---|
| FR | EP 1293389 A1 \* | 3/2003 | ............ | B60R 19/12 |
| JP | 2007-185983 A | 7/2007 | | |
| JP | 2007-216706 A | 8/2007 | | |
| JP | 2008-056191 A | 3/2008 | | |
| JP | 2009-040187 A | 2/2009 | | |
| JP | 2009-051440 A | 3/2009 | | |
| JP | 2009-248818 A | 10/2009 | | |
| JP | 2012-006545 A | 1/2012 | | |
| JP | 2012-045995 A | 3/2012 | | |
| WO | 2007/011238 A1 | 1/2007 | | |

\* cited by examiner

VEHICLE BODY IMPACT ABSORPTION STRUCTURE

CROSS-REFERENCE TO RELATED APPLICATION

The present application claims priority to Japanese Patent Application No. 2013-26500 filed on Dec. 24, 2013, which is incorporated herein by reference in its entirety.

BACKGROUND OF THE INVENTION

The present invention relates to vehicle body impact absorption structures that absorb impacts applied to bumpers.

A vehicle body impact absorption structure that absorbs the impact applied to a bumper may include impact absorption boxes arranged one above the other. International Publication No. WO2007/011238 describes an impact absorption structure that integrally connects two impact absorption boxes, which are arranged one above the other, with a flat joint. The joint has a central portion including a tetragonal opening.

SUMMARY OF THE INVENTION

To increase the impact energy absorption efficiency, it is desirable that the impact absorption boxes be deformed in an axial compression mode without breaking or bending. However, in the above-described impact absorption structure, the joint, which extends in the axial direction of the two impact absorption boxes, may obstruct deformation of the two impact absorption boxes in the axial compression mode.

Figure 11:
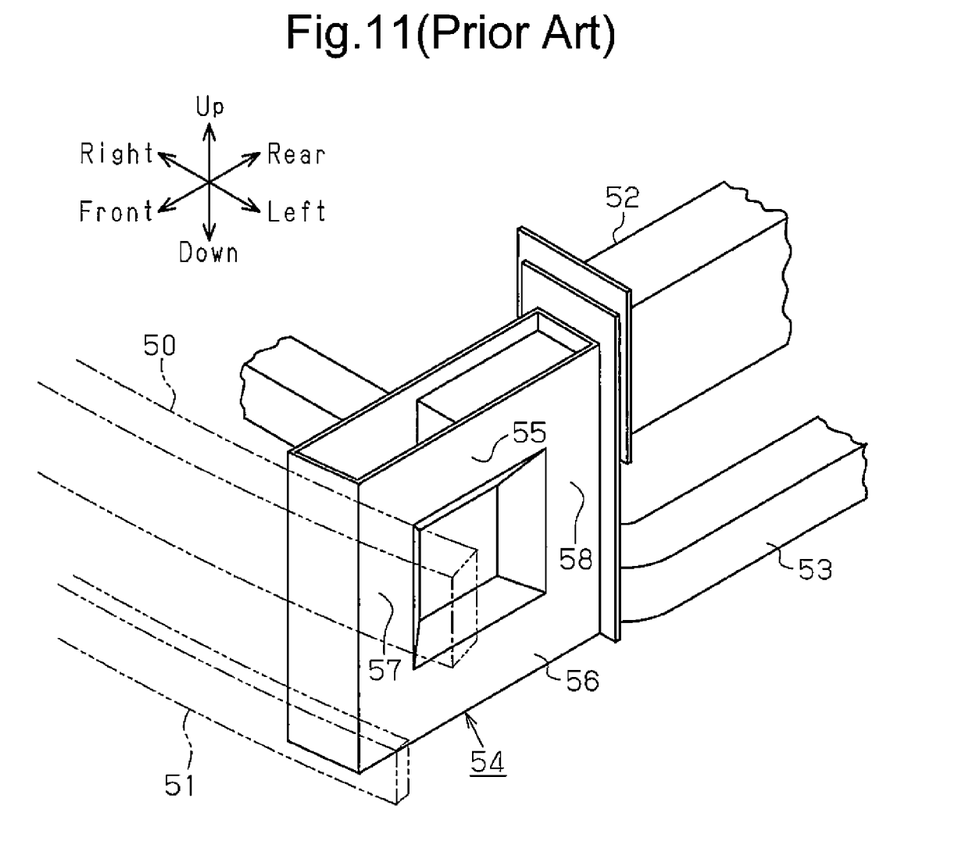
FIG. 11 is a perspective view showing one example of a conventional vehicle body impact absorption structure.

International Publication No. WO2007/011238 also describes an impact absorption structure such as that shown in FIG. 11. The impact absorption structure includes two bumper reinforcements 50 and 51, a front side member 52, an engine cradle 53, and an impact absorption box 54. The bumper reinforcements 50 and 51 are arranged one above the other and form the frame of a bumper. The front side member 52, which forms the frame of a vehicle body, and the engine cradle 53 serve as two vehicle body frame members. The impact absorption box 54 is located between the front side member 52 and the engine cradle 53. The impact absorption box 54 includes an upper impact absorption portion 55, which is located between the bumper reinforcement 50 and the front side member 52 and extends in the longitudinal direction of the vehicle body, and a lower impact absorption portion 56, which is located between the bumper reinforcement 51 and the engine cradle 53 and extends in the longitudinal direction of the vehicle body. Further, the impact absorption box 54 includes a front connection portion 57, which connects the front ends in the vehicle body longitudinal direction of the upper impact absorption portion 55 and the lower impact absorption portion 56, and a rear connection portion 58, which connects the rear ends in the vehicle body longitudinal direction of the upper impact absorption portion 55 and the lower impact absorption portion 56.

The upper impact absorption portion 55 and the lower impact absorption portion 56 of the impact absorption box 54 respectively include an open upper side and an open lower side. Thus, in the upper impact absorption portion 55 and the lower impact absorption portion 56, the rigidity is low with respect to twisting and bending, and the absorbable impact energy is limited.

It is an object of the present invention to provide a vehicle body impact absorption structure that absorbs impact energy with further efficiency.

One aspect of the present invention is a vehicle body impact absorption structure including a bumper reinforcement that forms a frame of a bumper. An upper vehicle body frame member forms a frame of a vehicle body. The upper vehicle body frame member includes a front end surface in a longitudinal direction of the vehicle body. A lower vehicle body frame member forms the frame of the vehicle body. The lower vehicle body frame member is located below the upper vehicle body frame member and includes a front end surface in the longitudinal direction of the vehicle body. An impact absorption box includes a rear portion in the longitudinal direction of the vehicle body and a front portion in the longitudinal direction of the vehicle body. The rear portion is connected to the front end surface of the upper vehicle body frame member and the front end surface of the lower vehicle body frame member. The front portion is connected to the bumper reinforcement. The impact absorption box includes an upper impact absorption portion having a closed cross-section and extending in the longitudinal direction of the vehicle body. The upper impact absorption portion includes a front end in the longitudinal direction of the vehicle body. A lower impact absorption portion is located below the upper impact absorption portion. The lower impact absorption portion has a closed cross-section, extends in the longitudinal direction of the vehicle body, and includes a front end in the longitudinal direction of the vehicle body. A front connection portion connects the front end of the upper impact absorption portion and the front end of the lower impact absorption portion. The front connection portion has a closed cross-section and extends in a vertical direction of the vehicle body. A communication portion is located at a rear side of the front connection portion in the longitudinal direction of the vehicle body between the upper impact absorption portion and the lower impact absorption portion. The communication portion includes an opening extending through the impact absorption box in a lateral direction of the vehicle body.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a vehicle body impact absorption structure will now be described in detail with reference to FIGS. 1 to 9. Hereinafter, the terms "upper" and "lower" will be used in relation with the vertical direction of the vehicle body. The terms "front" and "rear" will be used in relation with the longitudinal direction of the vehicle body. The terms "inner" and "outer" will be used in relation with the lateral direction of the vehicle body.

Figure 1:
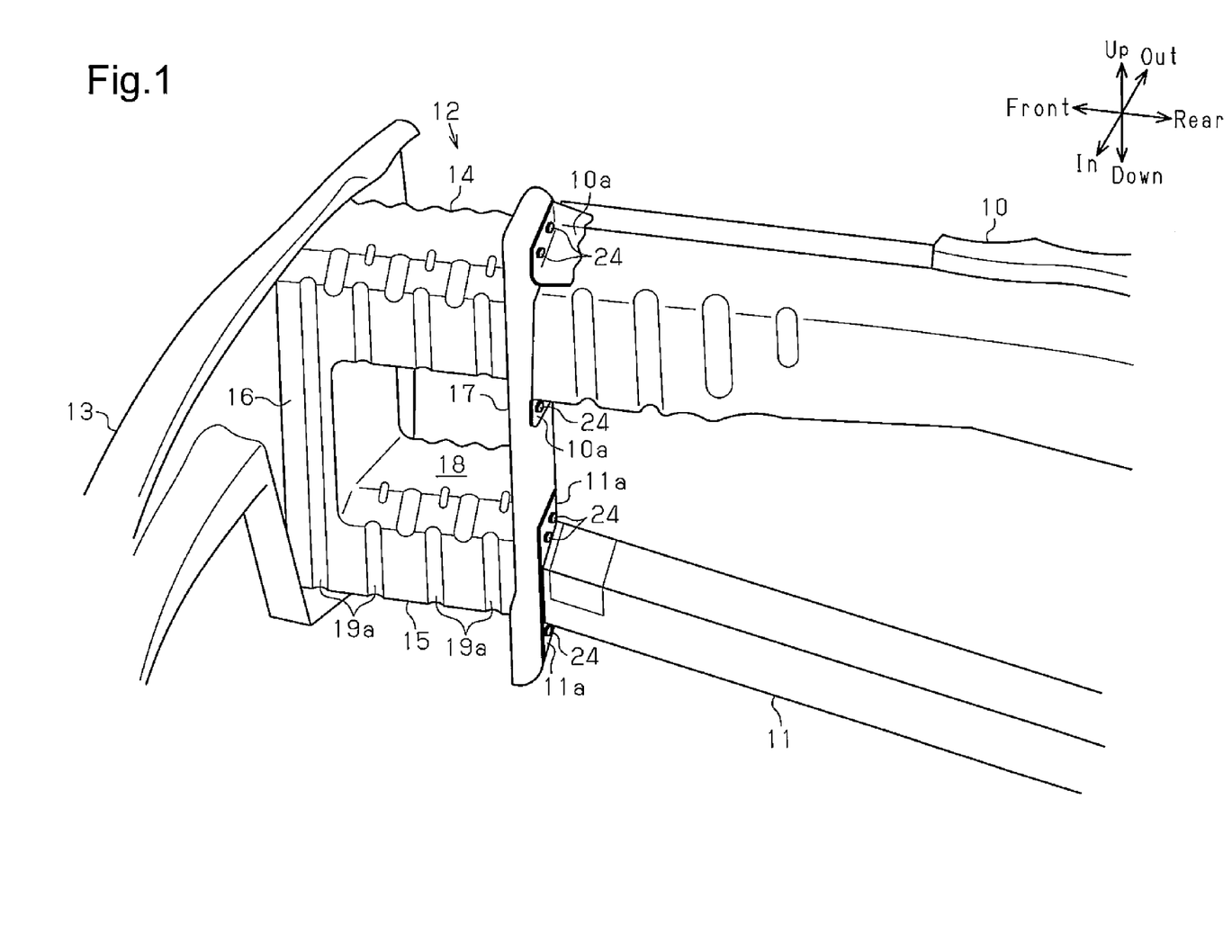
FIG. 1 is a perspective view showing a right front portion of a vehicle body frame implementing one embodiment of a vehicle body impact absorption structure

FIG. 1 shows a vehicle body frame at a right front portion of the vehicle body. The vehicle body frame is formed so that a left front portion is symmetrical to the right front portion.

As shown in FIG. 1, the right front portion of the vehicle body includes a front side member 10 and a lower member 11, which are arranged one above the other. The front side member 10 serves as an upper vehicle body frame member. The lower member 11 serves as a lower vehicle body frame member. The front side member 10 and the lower member 11 form a frame of the vehicle body and extend in the longitudinal direction of the vehicle body. The front side member 10 and the lower member 11 are connected to each other by a suspension member located at the rear of the area shown in FIG. 1.

An impact absorption box 12 connects a front end surface of the front side member 10 and a front end surface of the lower member 11. The front ends of the front side member 10 and the lower member 11 include flanges 10a and 11a, respectively. Each of the flanges 10a and 11a include bolt holes (not shown). The impact absorption box 12 has a rear wall surface (rear wall 21a, refer to FIG. 3) including bolt holes 21c and 21d (refer to FIG. 3) located at positions opposing the bolt holes of the flanges 10a and the bolt holes of the flanges 11a. Bolts 24 are inserted into the aligned bolt holes and tightened with nuts (not shown) to fasten the rear wall surface of the impact absorption box 12 with the flanges 10a and 11a. This connects the impact absorption box 12 to the front side member 10 and the lower member 11.

Further, the impact absorption box 12 has a front wall surface (front wall 20a, refer to FIG. 3) connected to a bumper reinforcement 13, which forms the frame of a bumper. The bumper reinforcement 13 includes a central portion, in the lateral direction of the vehicle body, and a connection portion, which is connected to the impact absorption box 12. The connection portion of the bumper reinforcement 13 includes bolt holes (not shown). The front wall surface (front wall 20a, refer to FIG. 3) of the impact absorption box 12 includes bolt holes 20c located at positions opposing the bolt holes of the bumper reinforcement 13. Bolts (not shown) are inserted into the aligned bolt holes and tightened with nuts (not shown) to fasten the front wall surface of the impact absorption box 12 with the bumper reinforcement 13. This connects the impact absorption box 12 to the bumper reinforcement 13.

The impact absorption box 12 may be connected to the front side member 10, the lower member 11, and the bumper reinforcement 13 through other means, such as spot welding, arc welding, or brazing.

The connection portion of the bumper reinforcement 13 has a larger width in the vertical direction of the vehicle body than the central portion of the bumper reinforcement 13. This entirely covers the front end of the impact absorption box 12 as viewed from the front of the vehicle body.

Figure 2:
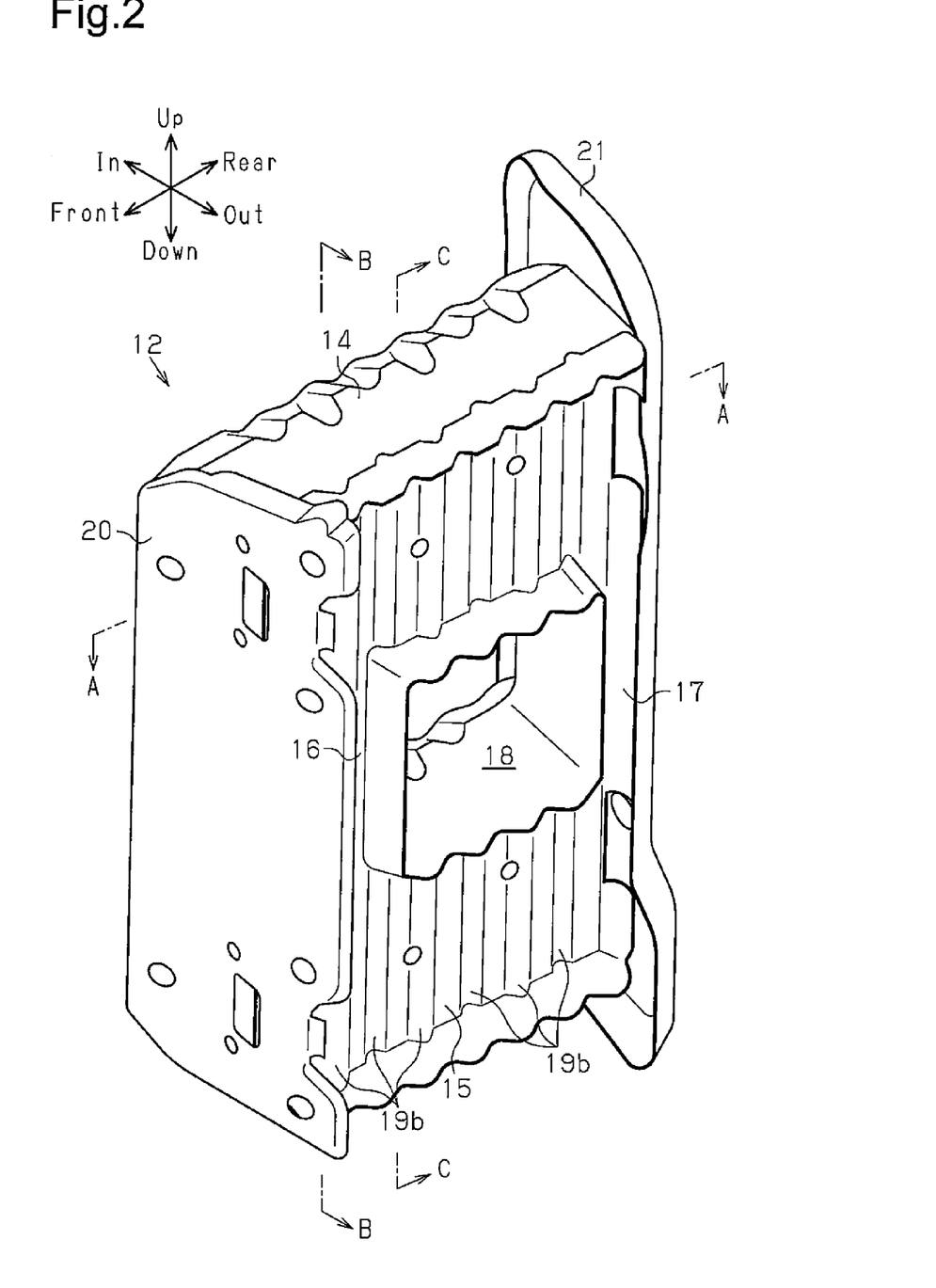
FIG. 2 is a perspective view of the impact absorption structure shown in FIG. 1.

FIG. 2 is a perspective view of the impact absorption box 12. The impact absorption box 12 shown in FIG. 2 is located in the left front portion of the vehicle body. The impact absorption box located in the right front portion of the vehicle body is symmetrical to the impact absorption box 12.

As shown in FIG. 2, the impact absorption box 12 includes an upper impact absorption portion 14 and a lower impact absorption portion 15, which is spaced apart toward the lower side from the upper impact absorption portion 14. Further, the impact absorption box 12 includes a front connection portion 16, which connects the front end of the upper impact absorption portion 14 and the front end of the lower impact absorption portion 15, and a rear connection portion 17, which connects the rear end of the upper impact absorption portion 14 and the rear end of the lower impact absorption portion 15. In addition, the impact absorption box 12 includes a communication portion 18, located between the upper impact absorption portion 14 and the lower impact absorption portion 15 behind the front connection portion 16 and in front of the rear connection portion 17. The communication portion 18 includes an opening extending through the impact absorption box 12 in the lateral direction of the vehicle body.

Each of the upper impact absorption portion 14 and the lower impact absorption portion 15 is tubular, has a closed cross-section, and extends in the longitudinal direction of the vehicle body. Further, each of the front connection portion 16 and the rear connection portion 17 is tubular, has a closed cross-section, and extends in the vertical direction of the vehicle body. It is desirable that the upper impact absorption portion 14 and the lower impact absorption portion 15 have the same cross-sectional shape.

Figure 3:
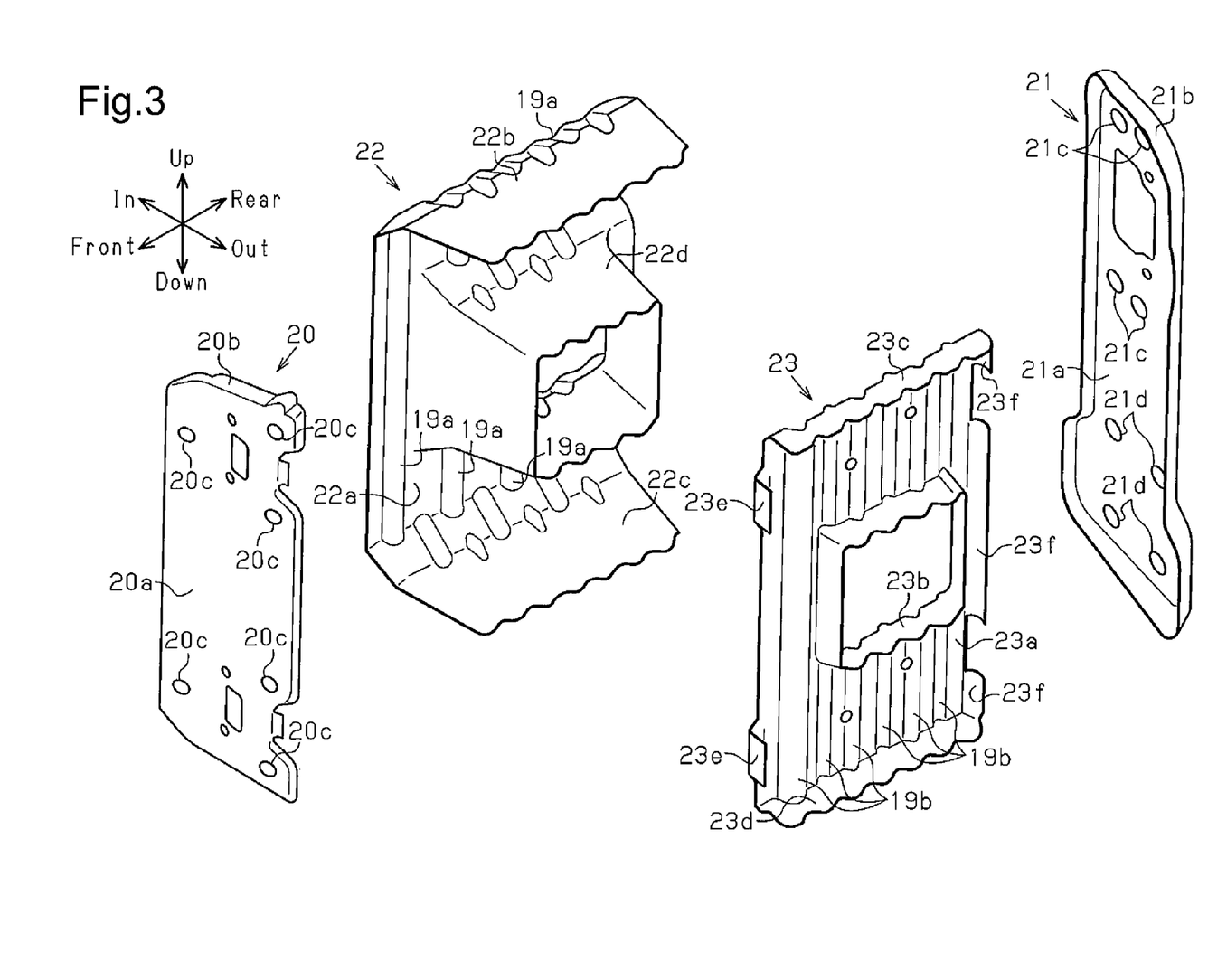
FIG. 3 is an exploded perspective view of an impact absorption box shown in FIG. 2.

As shown in FIG. 3, the impact absorption box 12 includes four components, namely, a front plate 20, a rear plate 21, an inner panel 22, and an outer panel 23. The four components are formed by, for example, pressing a metal plate. Further, spot welding, arc welding, or the like is performed to join these components.

The front plate 20 includes the front wall 20a, which forms the front wall surface of the impact absorption box 12, and a flange 20b, which is bent from the periphery of the front wall 20a to extend toward the rear of the vehicle body. The front wall 20a includes a plurality of (in this case, six) bolt holes 20c into which bolts are inserted to connect the impact absorption box 12 and the bumper reinforcement 13.

The rear plate 21 includes the rear wall 21a, which forms the rear wall surface of the impact absorption box 12, and a flange 21b, which is bent from the periphery of the rear wall 21a to extend toward the front of the vehicle body. The rear wall 21a has an upper portion including a plurality of (in this case, four) bolt holes 21c that receive the bolts 24 connecting the impact absorption box 12 and the front side member 10. The rear wall 21a also has a lower portion including a plurality of (in this case, four) bolt holes 21d that receive the bolts 24 connecting the impact absorption box 12 and the lower member 11.

The inner panel 22 includes an inner wall 22a, which forms the inner wall surface of the impact absorption box 12. An upper wall 22b, which forms an upper wall surface of the impact absorption box 12, extends from the upper end of the inner wall 22a toward the outer side in the lateral direction of the vehicle body. The upper wall 22b is bent along two ridge lines. Further, a lower wall 22c, which forms a lower wall surface of the impact absorption box 12, extends from the lower end of the inner wall 22a toward the outer side in the lateral direction of the vehicle body. The lower wall 22c is bent along two ridge lines. The inner wall 22a has a central portion defining the communication portion 18 with a tetragonal opening. An interior wall 22d, which forms the wall surface of the communication portion 18, projects toward the outer side in the lateral direction of the vehicle body around the opening.

The outer panel 23 includes an outer wall 23a, which forms an outer wall surface of the impact absorption box 12. The outer wall 23a has a central portion defining the communication portion 18 with the tetragonal opening. The surrounding of the opening is bent to form a central flange 23b that extends toward the outer side in the lateral direction of the vehicle body. The upper end and the lower end of the outer wall 23a are bent to extend toward the outer side and form an upper flange 23c and a lower flange 23d. Two front flanges 23e are bent from the front end of the outer wall 23a to extend toward the outer side in the lateral direction of the vehicle body. In addition, three rear flanges 23f are bent from rear end of the outer wall 23a to extend toward the outer side in the lateral direction of the vehicle body.

The inner wall 22a of the inner panel 22 includes four beads 19a, which extend in the vertical direction of the vehicle body. Three of the beads 19a are located in the upper impact absorption portion 14 and the lower impact absorption portion 15, and the remaining bead 19a is located in the front connection portion 16. Each bead 19a extends from the upper end to the lower end of the inner wall 22a.

The outer wall 23a of the outer panel 23 includes five beads 19b, which extend in the vertical direction of the vehicle body. Four of the beads 19b are located in the upper impact absorption portion 14 and the lower impact absorption portion 15, and the remaining bead 19b is located in the front connection portion 16. Each bead 19b extends from the upper end to the lower end of the outer wall 23a.

Figure 4:
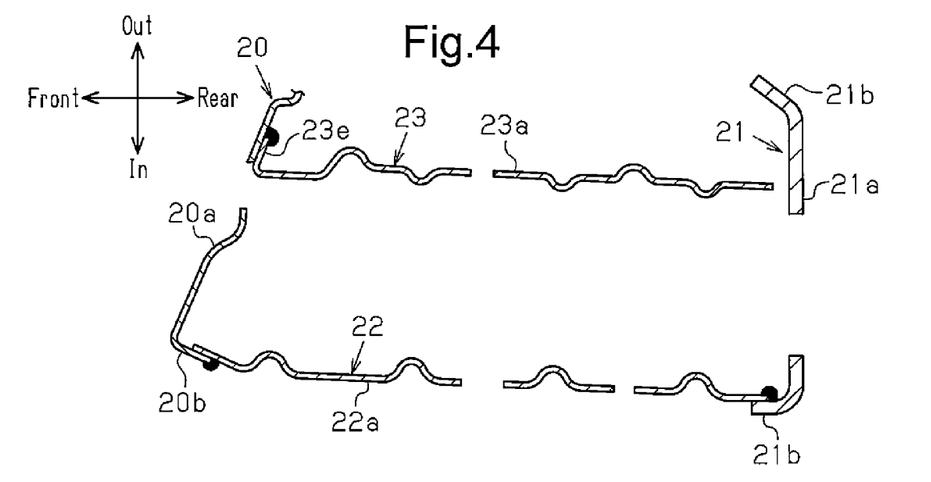
FIG. 4 is a cross-sectional view of the impact absorption structure taken along line A-A in FIG. 2.
Figure 5:
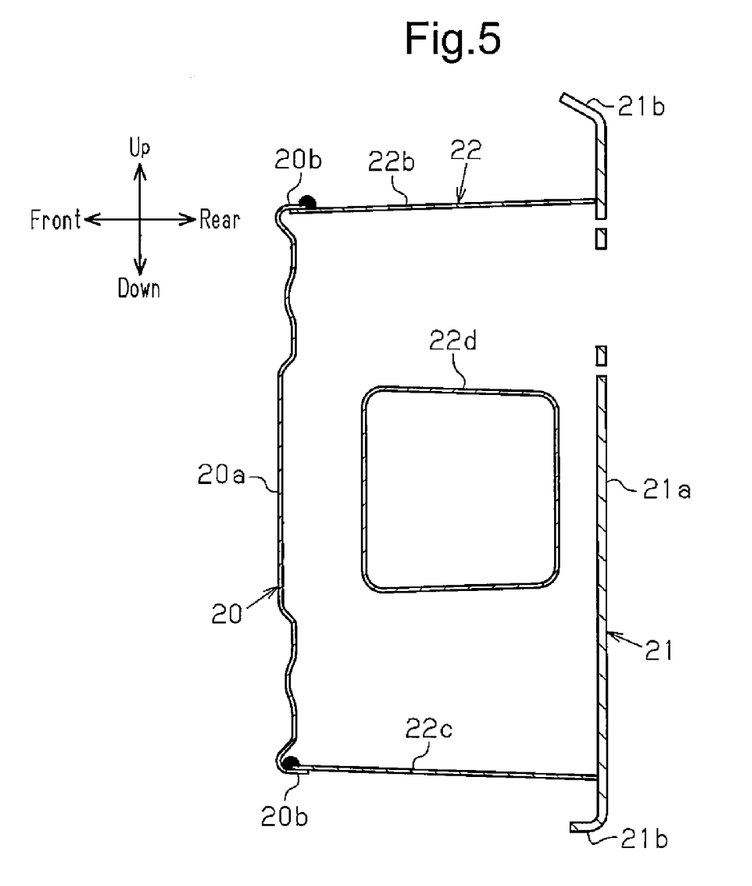
FIG. 5 is a cross-sectional view of the impact absorption structure taken along line B-B in FIG. 2.
Figure 6:
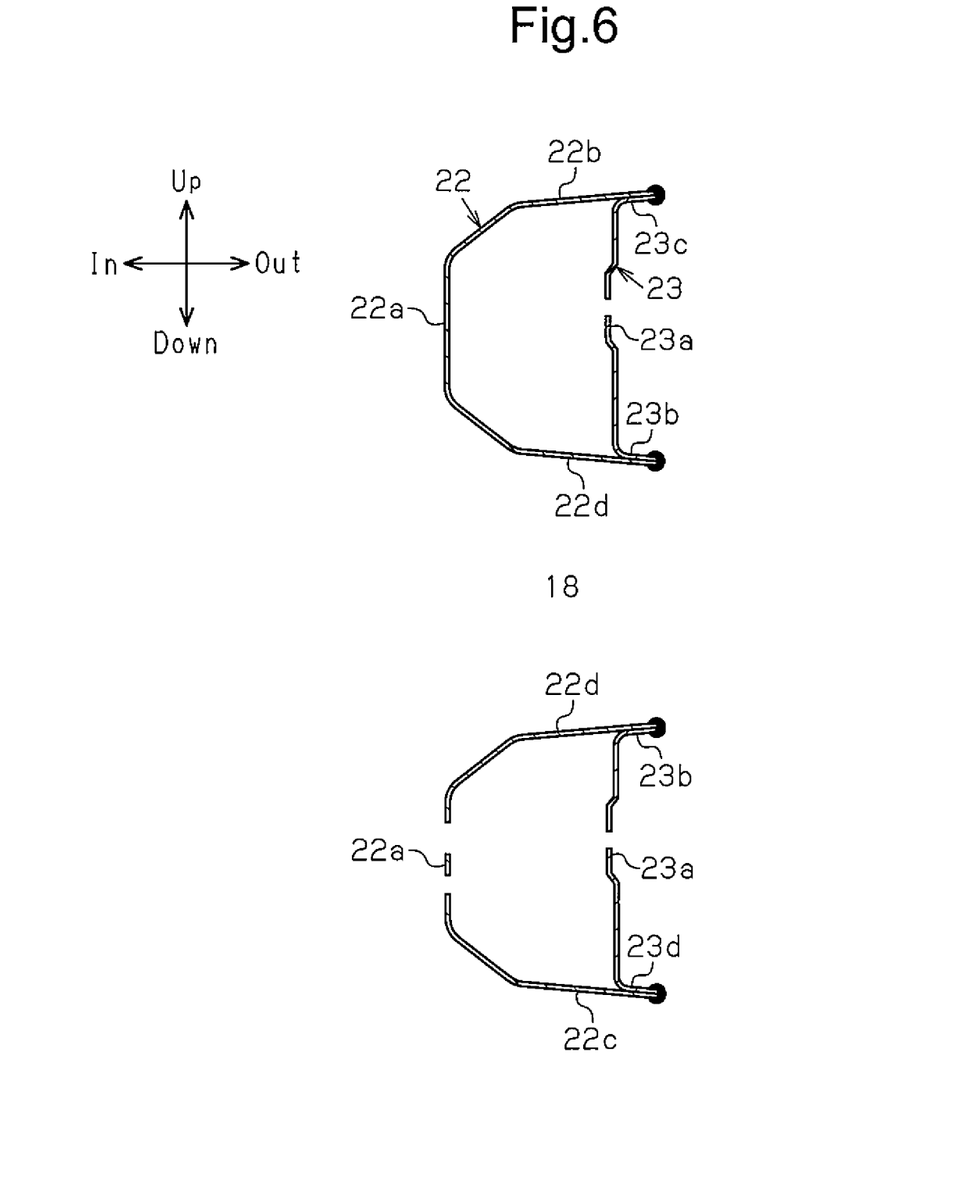
FIG. 6 is a cross-sectional view of the impact absorption box taken along line C-C in FIG. 2.

FIG. 4 is a cross-sectional view of the impact absorption box 12 taken along line A-A in FIG. 2. FIG. 5 is a cross-sectional view of the impact absorption box 12 taken along line B-B in FIG. 2. FIG. 6 is a cross-sectional view of the impact absorption box 12 taken along line C-C in FIG. 2.

As shown in FIGS. 4 to 6, the inner portion, the upper portion, and the lower portion in the flange 20b of the front plate 20 are respectively joined with front end of the inner wall 22a, the front end of the upper wall 22b, and the front end of the lower wall 22c in the inner panel 22. Further, the front wall 20a of the front plate 20 is joined with the front flanges 23e of the outer panel 23.

The inner portion in the flange 21b of the rear plate 21 is joined with rear end of the inner wall 22a in the inner panel 22. Further, the rear wall 21a of the rear plate 21 is joined with the rear flanges 23f of the outer panel 23.

The upper flange 23c and the lower flange 23d of the outer panel 23 are respectively joined with the outer ends of the upper wall 22b and the lower wall 22c of the inner panel 22.

The central flange 23b of the outer panel 23 is joined with the outer end of the interior wall 22d of the inner panel 22.

The operation of the present embodiment will now be described.

Figure 7:
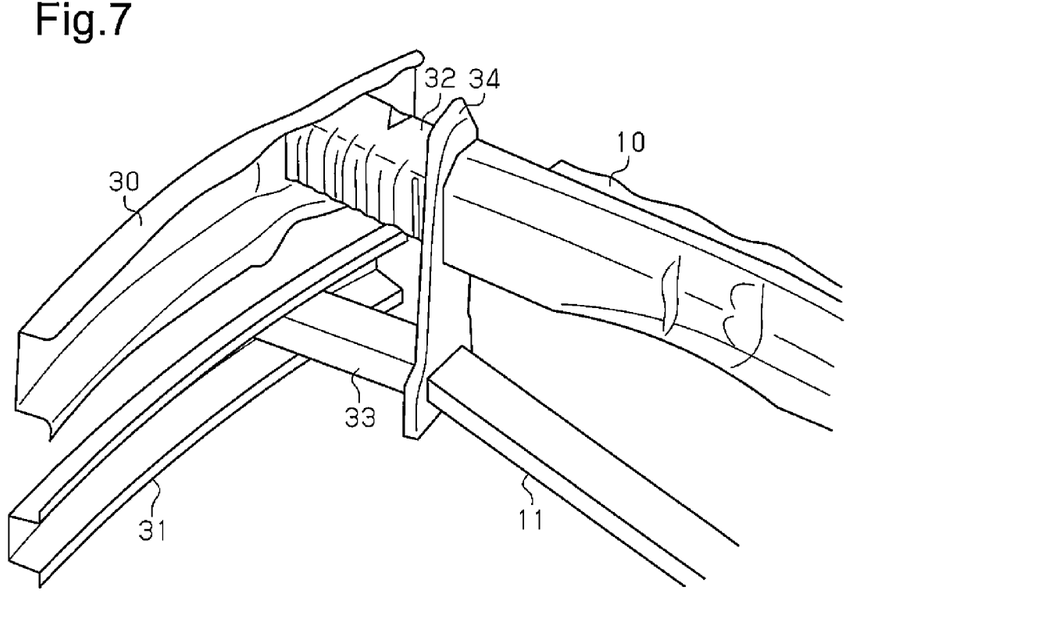
FIG. 7 is a perspective view showing a comparative example of an impact absorption structure including upper and lower impact absorption boxes that are independent from one another.

FIG. 7 shows the structure of a comparison example of a vehicle body impact absorption structure including two independent impact absorption boxes that are arranged one above the other. The vehicle body implementing this impact absorption structure includes two bumper reinforcements 30 and 31 that are arranged one above the other. The two bumper reinforcements 30 and 31 are connected by separate impact absorption boxes 32 and 33 to the front side member 10 and the lower member 11. More specifically, the front end surface of the upper impact absorption box 32 is connected to the upper bumper reinforcement 30. The rear end surface of the upper impact absorption box 32 is connected by a rear plate 34 to the front end surface of the front side member 10. In this manner, the upper impact absorption box 32 is connected to the upper bumper reinforcement 30 and the front side member 10. Further, the front end surface of the lower impact absorption box 33 is connected to the lower bumper reinforcement 31. The rear end surface of the lower impact absorption box 33 is connected by the rear plate 34 to the front end surface of the lower member 11. In this manner, the lower impact absorption box 33 is connected to the lower bumper reinforcement 31 and the lower member 11.

Figure 8:
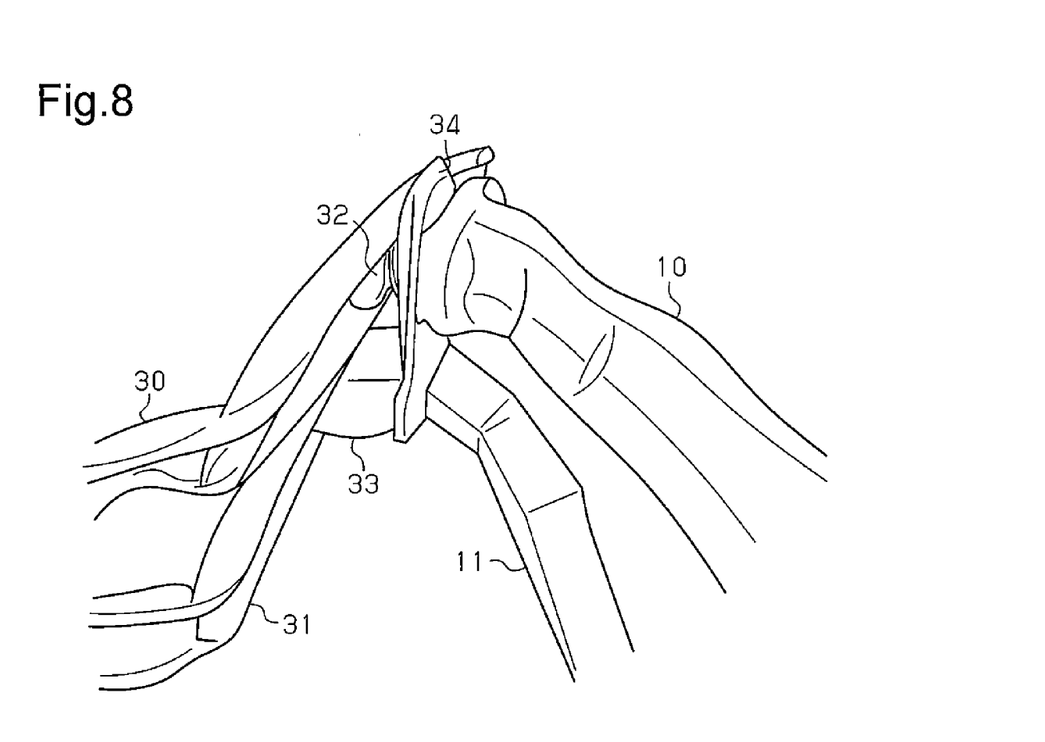
FIG. 8 is a perspective view showing deformation of the impact absorption structure shown in FIG. 7 when receiving an impact.

FIG. 8 shows an example of deformation of the vehicle body frame in the comparative example when an impact is applied to the bumper.

In the comparative example, the front ends of the upper and lower impact absorption boxes 32 and 33 are not connected to each other, and the supporting rigidity is low at the front portions of the impact absorption boxes 32 and 33. Thus, the deformation mode of the impact absorption boxes 32 and 33 is not stable. More specifically, in the comparison example, when an impact is applied to a location separated from the position where the impact absorption boxes 32 and 33 are coupled to the bumper reinforcements 30 and 31, the direction in which the impact is input to the impact absorption boxes deviate from the axial directions of the impact absorption boxes 32 and 33. Thus, the impact absorption boxes 32 and 33 easily bend and deform. Further, the two impact absorption boxes 32 and 33 are separately connected to the bumper reinforcements 30 and 31. This varies the impact load input to the impact absorption boxes 32 and 33 and easily produces a difference in the deformed amount of the impact absorption boxes 32 and 33.

In the case of FIG. 8, deviation in the input direction of the impact load causes bending deformation of the two impact absorption boxes 32 and 33 that greatly bends the bumper reinforcements 30 and 31. The upper impact absorption box 32 is practically completely crushed. In contrast, the lower impact absorption box 33 is insufficiently crushed. Thus, the lower member 11 is greatly bent. In this manner, in the impact absorption structure of the comparative example, deformation is unstable in the two impact absorption boxes 32 and 33. This hinders sufficient absorption of the impact energy.

Figure 9:
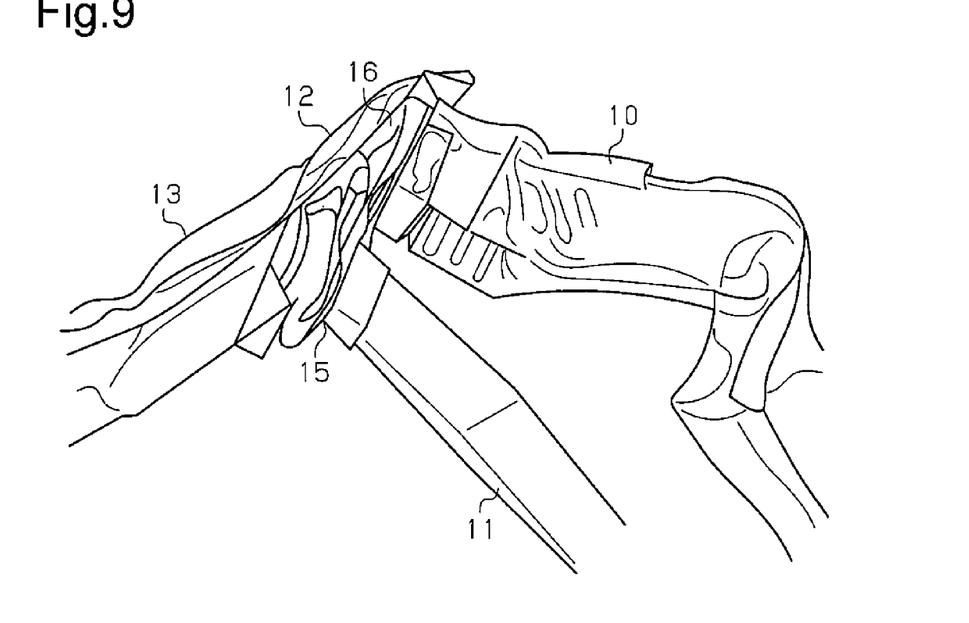
FIG. 9 is a perspective view showing deformation of the impact absorption structure shown in FIG. 1 when receiving an impact.

FIG. 9 shows an example of deformation of the vehicle body frame in a vehicle body impact absorption structure of the present embodiment when an impact is applied to the bumper in the same manner as FIG. 8.

In the vehicle body impact absorption structure of the present embodiment, the front connection portion 16 connects the front end of the upper impact absorption portion 14 and the front end of the lower impact absorption portion 15 to each other. The front connection portion 16 has a cross-section (horizontal cross-section) that increases the rigidity with respect to twisting and bending. In addition, the beads 19a and 19b extend in the vertical direction of the vehicle body on the inner and outer wall surfaces of the front connection portion 16 (inner wall 22a of inner panel 22 and outer wall 23a of outer panel 23). The rear connection portion 17, which connects the rear end of the upper impact absorption portion 14 and the rear end of the lower impact absorption portion 15, also has a closed cross-section that increases the rigidity with respect to twisting and bending.

In the impact absorption structure of the present embodiment, the portion of the bumper reinforcement 13 connected to the impact absorption box 12 is enlarged to entirely cover a front end surface of the impact absorption box 12. Thus, an impact load from the bumper reinforcement 13 is entirely applied to the front end of the impact absorption box 12.

In the impact absorption structure of the present embodiment, the front portion of the impact absorption box 12 has a higher rigidity with respect to twisting and bending that the comparative example. Thus, the direction of the impact load from the bumper reinforcement 13 does not easily deviate from the axial directions of the upper impact absorption portion 14 and the lower impact absorption portion 15. Further, the impact load from the bumper reinforcement 13 is entirely applied to the front end surface of the impact absorption impact absorption box 12. Thus, in contrast with the comparative example, the difference is minimized between the impact loads applied to the upper impact absorption portion 14 and the lower impact absorption portion 15. In addition, the communication portion 18 is located between the upper impact absorption portion 14 and the lower impact absorption portion 15. Thus, the upper impact absorption portion 14 and the lower impact absorption portion 15 stably deforms in the axial compression mode without any restraints. As a result, as shown in FIG. 9, in the impact absorption structure of the present embodiment, the upper impact absorption portion 14 and the lower impact absorption portion 15 are both completely crushed through deformation in the axial compression mode, and impact energy is absorbed more efficiently than the comparative example.

The vehicle body impact absorption structure of the present embodiment has the advantages described below.

(1) The front connection portion 16, which has a closed cross-section and extends in the vertical direction of the vehicle body, connects the front end of the upper impact absorption portion 14 and the front end of the lower impact absorption portion 15 to each other. This limits deviation and biasing of the input direction of the impact load relative to the axial direction of the upper impact absorption portion 14 and the lower impact absorption portion 15. Further, the upper impact absorption portion 14 and the lower impact absorption portion 15 are integrally deformed. Moreover, the communication portion 18 is located between the upper impact absorption portion 14 and the lower impact absorption portion 15. Thus, the impact absorption portions 14 and 15 are stably deformed in the axial compression mode without any restraints. Accordingly, impact energy may be absorbed with further efficiency.

(2) The rear connection portion 17, which has a closed cross-section and extends in the vertical direction of the vehicle body, connects the rear end of the upper impact absorption portion 14 and the rear end of the lower impact absorption portion 15 to each other. The rear connection portion 17 has a structure having high rigidity with respect to twisting and bending. This further limits differences in the input direction and amount of the impact load applied to the upper impact absorption portion 14 and the lower impact absorption portion 15.

(3) The upper impact absorption portion 14 includes an inner portion in the lateral direction and an outer portion in the lateral direction. The lower impact absorption portion 15 includes an inner portion in the lateral direction and an outer portion in the lateral direction. The inner portion of the upper impact absorption portion 14 is formed integrally with the inner portion of the lower impact absorption portion 15. The outer portion of the upper impact absorption portion 14 is formed integrally with the outer portion of the lower impact absorption portion 15. In other words, the impact absorption box 12 is formed from two separate portions. This allows for a reduction in the number of components in the impact absorption box 12 and the number of steps for assembling the impact absorption box 12. Thus, the manufacturing of the impact absorption box 12 is further facilitated.

(4) The beads 19a and 19b extending in the vertical direction of the vehicle body on the front connection portion 16 increases rigidity at the front portion of the impact absorption box 12 with respect to twisting and bending. This further limits differences in the input direction and amount of the impact load applied to the upper impact absorption portion 14 and the lower impact absorption portion 15 and further stably deforms the upper impact absorption portion 14 and the lower impact absorption portion 15.

(5) The beads 19a and 19b, which extend in the vertical direction of the vehicle body and are formed on the upper impact absorption portion 14 and the lower impact absorption portion 15, increases the rigidity with respect to twisting and bending and assists deformation in the axial compression mode. This further stably deforms the upper impact absorption portion 14 and the lower impact absorption portion 15.

(6) The portion of the bumper reinforcement 13 coupled to the impact absorption box 12 has a larger width in the vertical direction of the vehicle body than the central portion of the bumper reinforcement 13. Further, the portion of the bumper reinforcement 13 coupled to the impact absorption box 12 entirely covers the front end of the impact absorption box 12 as viewed from the front of the vehicle body. Thus, the impact load from the bumper reinforcement 13 is entirely applied to the front end surface of the impact absorption box 12. This further reduces differences in the input direction and amount of the impact load applied to the upper impact absorption portion 14 and the lower impact absorption portion 15.

(7) The locations where the outer panel 23 is welded to the inner panel 22 are all located at the outer side of the outer panel 23. This facilitates welding.

Further Embodiment

In the vehicle body impact absorption structure of the above embodiment, the front ends and the rear ends of the two impact absorption portions, which are arranged one above another, are both connected by tubular connection portions, which have closed cross-sections and extend in the vertical direction of the vehicle body. Sufficient impact energy absorption efficiency can also be ensured when only the front side includes the connection portion.

Figure 10:
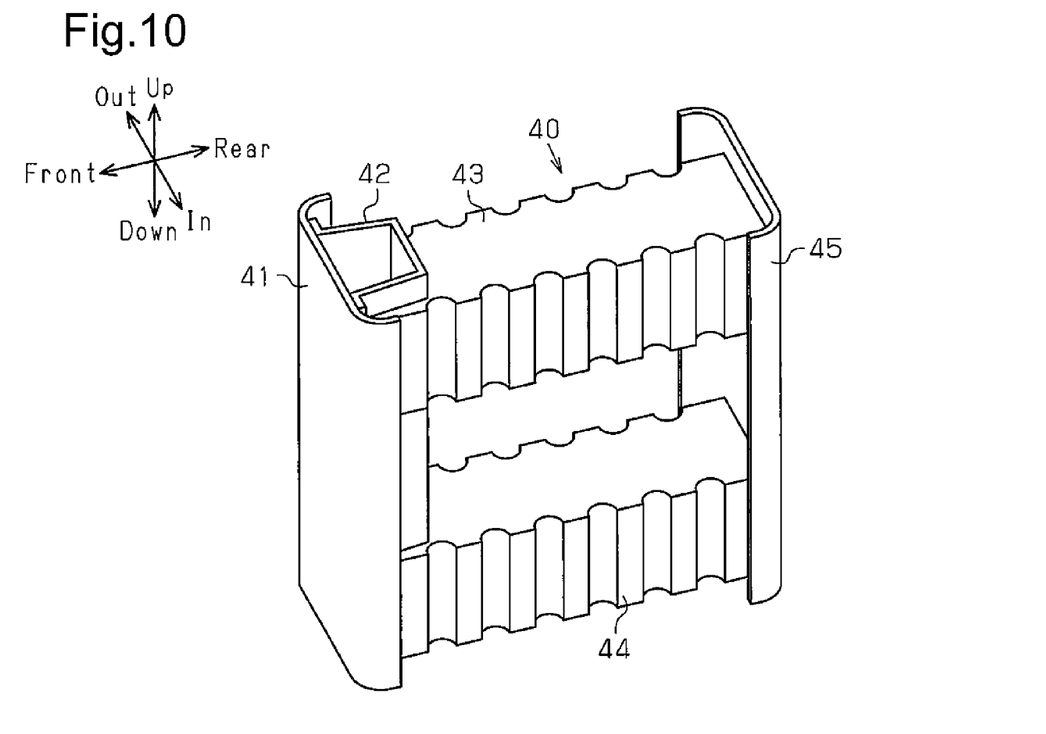
FIG. 10 is a perspective view of an impact absorption box in a further embodiment of a vehicle body impact absorption structure.

FIG. 10 shows one example of an impact absorption box that includes a coupling portion only at the front end. In FIG. 10, an impact absorption box 40 includes five parts, namely, a first front plate 41, a second front plate 42, an upper impact absorption portion 43, a lower impact absorption portion 44, and a rear plate 45.

The first front plate 41 is flat and located at the frontmost position of the impact absorption box 40. The second front plate 42 extends in the vertical direction of the vehicle body and includes a U-shaped cross-section that bulges toward the rear in the longitudinal direction of the vehicle body. The second front plate 42 is joined with the rear surface of the first front plate 41 through welding or the like. The upper impact absorption portion 43 and the lower impact absorption portion 44 each have a tubular shape, have a closed tetragonal cross-section and extend in the longitudinal direction of the vehicle body. The second front plate 42 includes an upper portion and a lower portion that are joined with each other through welding or the like. The rear plate 45 is flat and joined by welding or the like to the rear ends of the upper impact absorption portion 43 and the lower impact absorption portion 44. The first front plate 41 is fastened to a bumper reinforcement by bolts or the like, and the lower and upper portions of the rear plate 45 are respectively fastened to a front side member and a lower member by bolts or the like. This couples the impact absorption box 40 to a vehicle body frame.

In the impact absorption box 40, the first front plate 41 and the second front plate 42, which are joined with each other, form a tubular front connection portion connecting the front ends of the upper impact absorption portion and the lower impact absorption portion. Further, the front connection portion has a closed cross-section and extends in the vertical direction of the vehicle body.

In a vehicle body absorption structure including the impact absorption box 40, the support rigidity of the two impact absorption portions is ensured at the front side of the impact absorption box 40. This limits differences in the input direction and amount of the impact load applied to the two impact absorption portions. Thus, the two impact absorption portions are stably deformed in the axial compression mode when an impact is applied.

It should be apparent to those skilled in the art that the present invention may be embodied in many other specific forms without departing from the spirit or scope of the invention. Particularly, it should be understood that the present invention may be embodied in the following forms.

In the first embodiment, the bumper reinforcement 13 has a width that is locally enlarged in the vertical direction of the vehicle body at the connection portion of the impact absorption box 12. However, the bumper reinforcement 13 is not limited to such a shape. That is, as long as sufficient support rigidity is ensured at the front side of the impact absorption box 12, a portion where the width is locally enlarged may be omitted from the bumper reinforcement 13. This would also limit differences in the input direction and amount of the impact load applied to the upper impact absorption portion 14 and the lower impact absorption portion 15. Further, instead of a single bumper reinforcement, two bumper reinforcements arranged one above the other may be employed.

The number and location of the beads 19a and 19b on the impact absorption box may be freely changed. Further, the beads 19a and 19b may be omitted as long as the upper impact absorption portion 14 and the lower impact absorption portion 15 can be stably deformed.

The impact absorption box does not have to be formed by separate portions as described in the above embodiment and may have a different structure.

In the above embodiment, the upper and lower impact absorption portions have the same length and have front and rear ends located at the same position in the longitudinal direction of the vehicle body. Instead, the front ends of the two impact absorption portions may be located at different positions in the longitudinal direction of the vehicle body, and the rear ends of the two impact absorption portions may be located at different positions in the longitudinal direction of the vehicle body. Further, the upper and lower impact absorption portions may have different lengths. This increases the degree of freedom for the design of the vehicle body.

In the above embodiment, the lower member 11 corresponds to the lower vehicle body frame member. When the engine cradle, which holds the engine or the like, is located at the front portion of the vehicle body as a vehicle body frame member, the engine cradle may form an impact absorption structure so that the engine cradle serves as the lower vehicle body frame member. Further, a vehicle body frame member may be located between the impact absorption box and the engine cradle, and the vehicle body frame member may form the impact absorption structure as the lower body frame member.

The present examples and embodiments are to be considered as illustrative and not restrictive, and the invention is not to be limited to the details given herein, but may be modified within the scope and equivalence of the appended claims.

The invention claimed is:

1. A vehicle body impact absorption structure comprising:
a bumper reinforcement that forms a frame of a bumper;
an upper vehicle body frame member that forms a frame of a vehicle body, wherein the upper vehicle body frame member includes a front end surface in a longitudinal direction of the vehicle body;
a lower vehicle body frame member that forms the frame of the vehicle body, wherein the lower vehicle body frame member is located below the upper vehicle body frame member and includes a front end surface in the longitudinal direction of the vehicle body;
an impact absorption box including a rear portion in the longitudinal direction of the vehicle body and a front portion in the longitudinal direction of the vehicle body, wherein the rear portion is connected to the front end surface of the upper vehicle body frame member and the front end surface of the lower vehicle body frame member, and the front portion is connected to the bumper reinforcement, wherein the impact absorption box includes
an upper impact absorption portion having a closed cross-section and extending in the longitudinal direction of the vehicle body, wherein the upper impact absorption portion includes a front end in the longitudinal direction of the vehicle body,
a lower impact absorption portion located below the upper impact absorption portion, wherein the lower impact absorption portion has a closed cross-section, extends in the longitudinal direction of the vehicle body, and includes a front end in the longitudinal direction of the vehicle body,
a front connection portion that connects the front end of the upper impact absorption portion and the front end of the lower impact absorption portion, wherein the front connection portion has a closed cross-section and extends in a vertical direction of the vehicle body, and
a communication portion located at a rear side of the front connection portion in the longitudinal direction of the vehicle body between the upper impact absorption portion and the lower impact absorption portion, wherein the communication portion includes an opening extending through the impact absorption box in a lateral direction of the vehicle body, said opening including an upper interior wall, which is at least part of a lower wall of the upper impact absorption portion, and a lower interior wall, which is at least part of an upper wall of the lower impact absorption portion.

2. The vehicle body impact absorption structure according to claim 1, wherein
the upper impact absorption portion includes a rear end in the longitudinal direction of the vehicle body,
the lower impact absorption portion includes a rear end in the longitudinal direction of the vehicle body, and
the impact absorption box further includes a rear connection portion that connects the rear end of the upper impact absorption portion and the rear end of the lower impact absorption portion, wherein the rear connection portion has a closed cross-section and extends in the vertical direction of the vehicle body.

3. The vehicle body impact absorption structure according to claim 1, wherein
the upper impact absorption portion includes an inner portion in the lateral direction of the vehicle body and an outer portion in the lateral direction of the vehicle body,
the lower impact absorption portion includes an inner portion in the lateral direction of the vehicle body and an outer portion in the lateral direction of the vehicle body,
the inner portion of the upper impact absorption portion is formed integrally with the inner portion of the lower impact absorption portion, and
the outer portion of the upper impact absorption portion is formed integrally with the outer portion of the lower impact absorption portion.

4. The vehicle body impact absorption structure according to claim 1, wherein the front connection portion includes a bead that extends in the vertical direction of the vehicle body.

5. The vehicle body impact absorption structure according to claim 1, wherein
the bumper reinforcement includes a central portion in the lateral direction of the vehicle body and a connection portion connected to the impact absorption box,
the connection portion has a larger width than the central portion in the vertical direction of the vehicle body, and
the connection portion is formed to entirely cover a front end surface of the impact absorption box as viewed from the front of the vehicle body.

* * * * *

UNITED STATES PATENT AND TRADEMARK OFFICE
CERTIFICATE OF CORRECTION

PATENT NO.         : 9,539,967 B2
APPLICATION NO.    : 14/568688
DATED              : January 10, 2017
INVENTOR(S)        : Takeo Mori It is certified that error appears in the above-identified patent and that said Letters Patent is hereby corrected as shown below:

In the Specification

At Column 1, Line 8, change the content from "Application No. 2013-26500" to "Application No. 2013-265220"

Signed and Sealed this
Twenty-second Day of May, 2018

Andrei Iancu
*Director of the United States Patent and Trademark Office*